US006728452B2

(12) United States Patent
Nishimura

(10) Patent No.: US 6,728,452 B2
(45) Date of Patent: Apr. 27, 2004

(54) OPTICAL CABLE, METHOD OF INSTALLING OPTICAL CABLE, AND OPTICAL TRANSMISSION LINE

(75) Inventor: Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 88 days.

(21) Appl. No.: 09/964,845

(22) Filed: Sep. 28, 2001

(65) Prior Publication Data

US 2002/0039473 A1 Apr. 4, 2002

(30) Foreign Application Priority Data

Sep. 29, 2000 (JP) .......................... 2000-300180

(51) Int. Cl.⁷ .............................................. G02B 6/255
(52) U.S. Cl. ........................................ 385/100; 385/96
(58) Field of Search .................... 385/95–100, 123–128

(56) References Cited

U.S. PATENT DOCUMENTS

| | | | | |
|---|---|---|---|---|
| 5,191,631 A | * | 3/1993 | Rosenberg | 385/123 |
| 5,611,016 A | | 3/1997 | Fangmann et al. | 385/100 |
| 5,657,413 A | * | 8/1997 | Ray et al. | 385/139 |
| 5,778,128 A | * | 7/1998 | Wildeman | 385/123 |
| 6,215,930 B1 | * | 4/2001 | Estes et al. | 385/100 |
| 2002/0003938 A1 | * | 1/2002 | Srikant | 385/124 |

FOREIGN PATENT DOCUMENTS

| JP | 03-130705 | 6/1991 |
|---|---|---|
| WO | WO 01/18572 | 8/2000 |

OTHER PUBLICATIONS

Chung, H.S. et al, 320–Gb/s WDM Transmission with 50–GHz Channel Spacing Over 564 km of Short–Period Dispersion–Managed Fiber (Perfect Cable), IEEE Photonics Technology Letters, vol. 12, No. 10 Oct. 2000, pp 1397–1399.*

M. Tsukitani, T. Kato, E. Yanada, M. Hirano, M. Nakamura, Y. Ohga, M. Onishi, E. Sasaoka, Y. Makio, and M. Nishimura, "Low–Loss Dispersion–Flattened Hybrid Transmission Lines Consisting Of Low–Nonlinearity Pure Silica Core Fibres And Dispersion Compensating Fibres," Electronics Letters, vol. 36, No. 1, Jan. 6, 2000, pp. 64–66.

Masahito Morimoto, Ichiro Kobayashi, Hideyo Hiramatsu, Kazunori Mukasa, Ryuichi Sugizaki, Yoshihisa Suzuki, and Yasuhiro Kamikura, "Study On Mechanical And Optical Characteristics Of Reverse Dispersion Fiber Cables," International Wire & Cable Symposium Proceedings 1999, pp. 51–54.

Lars Grüner–Nielsen, and Stig Nissen Knudsen, "Cabling Of Dispersion Compensating Fibres," International Wire & Cable Symposium Proceedings 1999, pp. 483–487.

U.S. patent application Ser. No. 09/655,718, Filed Sep. 5, 2000.

* cited by examiner

Primary Examiner—Brian Healy
Assistant Examiner—Sarah U Song
(74) Attorney, Agent, or Firm—McDermott, Will & Emery

(57) ABSTRACT

An optical cable has a reduced slicing loss and superior characteristics in the efficiency of the installation work thereof, and is therefore suitable for installation on land. First and second optical fibers have been connected together by fusion splicing to form joints thereby providing an optical fiber line. Each first optical fiber has a positive chromatic dispersion at a signal light wavelength while each second optical fiber has a negative chromatic dispersion at the same wavelength. The first and the second optical fibers, including the joints, are accommodated in the optical cable.

13 Claims, 3 Drawing Sheets

OPTICAL CABLE, METHOD OF INSTALLING OPTICAL CABLE, AND OPTICAL TRANSMISSION LINE

BACKGROUND OF THE INVENTION

1. Field of the Invention

The present invention relates to an optical cable which can suitably be installed on land, as well as to a method of installing the same. This invention also is concerned having an optical transmission line comprising such optical cable.

2. Description of the Background Art

Hybrid optical transmission lines have been known, which employ a first optical fiber having a positive chromatic dispersion at signal light wavelength, and a second optical fiber connected to the first optical fiber having a negative chromatic dispersion at the same wavelength. In regard to such hybrid optical transmission lines, reference is made to, for example, Document 1, M. Tsukitani et al., "Low-loss dispersion-flattened hybrid transmission lines consisting of low-nonlinearity pure silica core fibers and dispersion compensating fibers", Electron. Lett., Vol. 36, No. 1, pp. 64–66 (2000).

The optical transmission lines disclosed in this document can effectively suppress degradation of the signal attributable to a non-linear optical effect, by using the first optical fiber having an enlarged effective area for the upstream part of the optical transmission line where the signal light power is strong. In addition, by reducing the absolute value of overall chromatic dispersion, degradation of the signal can be suppressed. The hybrid transmission line disclosed in this document can be suitably used for optical transmission systems that transmit a large volume of information over a long distance.

Dispersion managed optical transmission line has been known in which the above-mentioned first and second optical fibers are connected alternately. In this dispersion managed optical transmission line, the absolute value of chromatic dispersion at each point can be increased so as to suppress degradation of the signal caused by four-wave mixing which is a kind of non-linear optical effect. The dispersion managed optical transmission line also can reduce the absolute value of overall chromatic dispersion to suppress degradation of the signal, and can be suitably used in optical transmission systems which transmit a large volume of information over a long distance.

In the meantime, the hybrid optical transmission line comprising optical cables has been also proposed. By way of example, reference is made to Document 2, M. Morimoto, et al., "Study on mechanical and optical characteristics of reverse dispersion fiber cables", International Wire & Cable Symposium Proceedings 1999, pp. 51–54, or to Document 3, L. Gruner-Nielsen, et al., "Cabling of dispersion compensating fibers", International Wire & Cable Symposium Proceedings 1999, pp. 483–487.

The length of optical cable that can be installed on land is generally not exceeding about 10 km. Thus, a feasible method is to construct a hybrid optical transmission line or a dispersion managed optical transmission line by manufacturing and installing, on land, the first optical cable containing only a plurality of first optical fibers and the second optical cable containing only a plurality of second optical fibers, and then the optical fibers contained in the first and second optical cables, respectively, are connected together by fusion splicing.

In general, the effective area of the first optical fiber having a positive chromatic dispersion at the signal light wavelength is larger than that of the second optical fiber having a negative chromatic dispersion at the same wavelength. Connecting these two types of optical fibers having different effective areas simply by fusion splicing produces a big splicing loss. A method has been proposed, therefore, to reduce the splicing loss by heating the spliced joints to cause diffusion of dopants, after the fusion splicing operation. Such a method is disclosed, for example, in Japanese Patent Application Laid-Open No. H3-130705.

SUMMARY OF THE INVENTION

It is an object of the present invention to provide an optical cable having a reduced splicing loss while affording high efficiency of installation work, and so is suitable to be installed on land. This invention also provides a method of installing optical cables on land to construct an optical transmission line, as well as the optical transmission line itself comprising such optical cables.

In order to achieve this object, such an optical cable is provided, that a first optical fiber having a positive chromatic dispersion at 1.55 $\mu$m wavelength and a second optical fiber having a negative chromatic dispersion at the same wavelength having been connected with each other by fusion splicing to form a joint are accommodated therein.

The optical cable may have a length which is not less than 1 km but not more than 10 km. The ratio of the effective area of the first optical fiber to that of the second optical fiber may be 0.5 or less, or 2.0 or more. The distance between the spliced joint and the adjacent end of the optical cable may be not less than 100 m. The absolute chromatic dispersion value of each of the first and second optical fibers may not be less than 10 ps/nm/km. The joint part may have been subjected to heat treatment and re-coated after the fusion splicing operation. The splicing loss at the spliced joint may be not more than 0.3 dB. Also each of the first and the second optical fibers may be provided with information for identifying each type of optical fiber. Throughout this specification, values of characteristics are those to be obtained at the wavelength of 1.55 $\mu$m, unless otherwise specified.

A method of installing an optical cable is also provided in which a first optical cable relating to the present invention and a second optical cable accommodating the same type of optical fibers as those in the first optical cable are installed on land, and then the optical fibers of the same type accommodated in the first and second optical cables are connected together by fusion splicing. Alternatively, a first and a second optical cables each relating to the present invention are installed on land, and the optical fibers of the same type accommodated in the first and second optical cables are connected together by fusion splicing.

The above and further objects and novel features of the invention will be more fully clarified in the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE INVENTION

Figure 1:
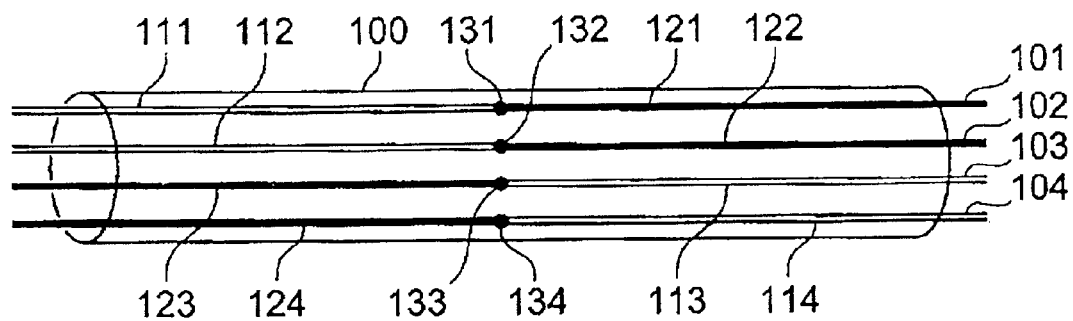
FIG. 1 is an illustration of an optical cable relating to the first and second embodiments of the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawing are partly exaggerated and do not always correspond to actual ratios of dimensions.

At first, a description will be given about an optical cable embodying the present invention. FIG. 1 is an illustration of an optical cable 100 embodying the invention. The optical cable 100 accommodates four optical fiber lines 101 to 104 inclusive. The optical fiber line 101 has a first optical fiber 111 and second optical fiber 121, which are connected by fusion splicing at a joint 131. Likewise, the optical fiber line 102 has a first optical fiber 112 and second optical fiber 122, which are connected by fusion splicing at a joint 132. Similarly, the optical fiber line 103 has a first optical fiber 113 and second optical fiber 123, which are connected by fusion splicing at a joint 133. The optical fiber line 104 has a first optical fiber 114 and second optical fiber 124, which are connected by fusion splicing at a joint 134. The first optical fibers 111 to 114 inclusive and the second optical fibers 121 to 124 inclusive, including the joints 131 to 134 inclusive, are accommodated in the optical cable 100. Such optical cable 100 is delivered from a factory. This optical cable 100 does not have any cable jointing means such as a closure.

Each of the first optical fibers 111 to 114 inclusive has a positive chromatic dispersion at a signal light wavelength. On the other hand, each of the second optical fibers 121 to 124 inclusive has a negative chromatic dispersion at the same wavelength. The term "signal light wavelength" used here means the wavelength of the signal light to be transmitted through an optical transmission system which is constructed by using this optical cable 100. By way of example, the signal light wavelength may be 1.55 $\mu$m. Each of the first optical fibers 111 to 114 inclusive may be a standard single-mode optical fiber having zero chromatic dispersion at a wavelength near 1.3 $\mu$m, a chromatic dispersion of about +17 ps/nm/km at 1.55 $\mu$m, and an effective area of about 80 $\mu m^2$. On the other hand, each of the second optical fibers 121 to 124 inclusive may be a dispersion compensation optical fiber having a chromatic dispersion of about −17 ps/nm/km at 1.55 $\mu$m, and an effective area of about 25 $\mu m^2$.

This optical cable 100 can suitably be installed on land when its length is not less than 1 km but not more than 10 km. The cable length of not more than 10 km makes this optical cable 100 suitable for installing on land. The cable length of 1 km or more makes the number of junction to a practical one when optical transmission lines are constructed by installing optical cable 100.

In the production of this optical cable 100, fusion-splicing operation between different types of optical fibers is conducted in a factory. The splicing operation can be done easily and precisely in the factory, contributing to a reduction of splicing loss. In particular, when the ratio of effective area of each of first optical fibers 111 to 114 inclusive to that of each of second optical fibers 121 to 124 inclusive is not more than 0.5 or not less than 2.0, it is difficult to reduce the splicing loss when the splicing operation is done at a site or field. Thus, the splicing operation conducted in the factory provides a significant advantage.

Preferably, the distance between each of the joints 131 to 134 inclusive and the adjacent end of this optical cable 100 is not less than 100 m. This eliminates the risk of losing the joints 131 to 134 inclusive when the end portion of the optical cable 100 is cut and severed at a site where the optical cable 100 is installed to form an optical transmission line. That is, even when the end portion of the optical cable 100 is cut and severed, the optical fiber lines 101 to 104 inclusive contained in the optical cable 100 still consists of the first optical fibers 111 to 114 inclusive and the second optical fibers 121 to 124 inclusive spliced together, respectively.

Preferably, each of the first optical fibers 111 to 114 inclusive in the optical cable 100 has a chromatic dispersion of 10 ps/nm/km or more at the signal light wavelength, while each of the second optical fibers 121 to 124 inclusive has a chromatic dispersion of −10 ps/nm/km or less at the signal light wavelength. Such chromatic dispersion characteristics provide a large absolute value of chromatic dispersion at every point of the optical fiber lines 101 to 104 inclusive, thereby effectively suppressing degradation of the signal light attributable to four-wave mixing. Therefore, the optical cable of the illustrated embodiment can suitably be used to form a hybrid optical transmission line or a dispersion managed optical transmission line.

Preferably, the joints 131 to 134 inclusive are subjected to heat treatment after the fusion splicing operation. Such heat treatment causes diffusion of dopants that have been added to increase or decrease the refractive index of silica glass, a main material of each optical fiber, resulting in reduction of the splicing loss to, for example, 0.15 dB.

It is also preferred that each of the joints 131 to 134 inclusive is re-coated with resin after the fusion splicing (or after heat treatment, when the above-mentioned heat treatment is conducted). This re-coating provides at each of the joints 131 to 134 inclusive a coating diameter substantially the same as that of other portion of each optical fiber line (usually 250 $\mu$m or so), facilitating the accommodation in the optical cable 100.

Each of the joints 131 to 134 inclusive preferably has a splicing loss of 0.3 dB or less. Such a low splicing loss can be easily obtained by the aforesaid heat treatment conducted subsequent to the fusion splicing. With such features, this optical cable 100 exhibits a reduced overall loss to realize a long-distance optical transmission line.

Preferably, each of the first optical fibers 111 to 114 inclusive and each of the second optical fibers 121 to 124 inclusive is provided with information for identifying the type of optical fiber, i.e., whether the optical fiber is of the first type having a positive dispersion or of the second type having a negative dispersion. Such identification information may be given by designating a specific color to the coating resin of each type of optical fibers, or by means of a symbol or a sign written in the surface of the coating resin. Such information facilitates the identification of the types of the optical fibers contained in the optical cable 100, and facilitates the operation of splicing optical fibers contained in this optical cable to those in the other optical cable.

Figure 2:
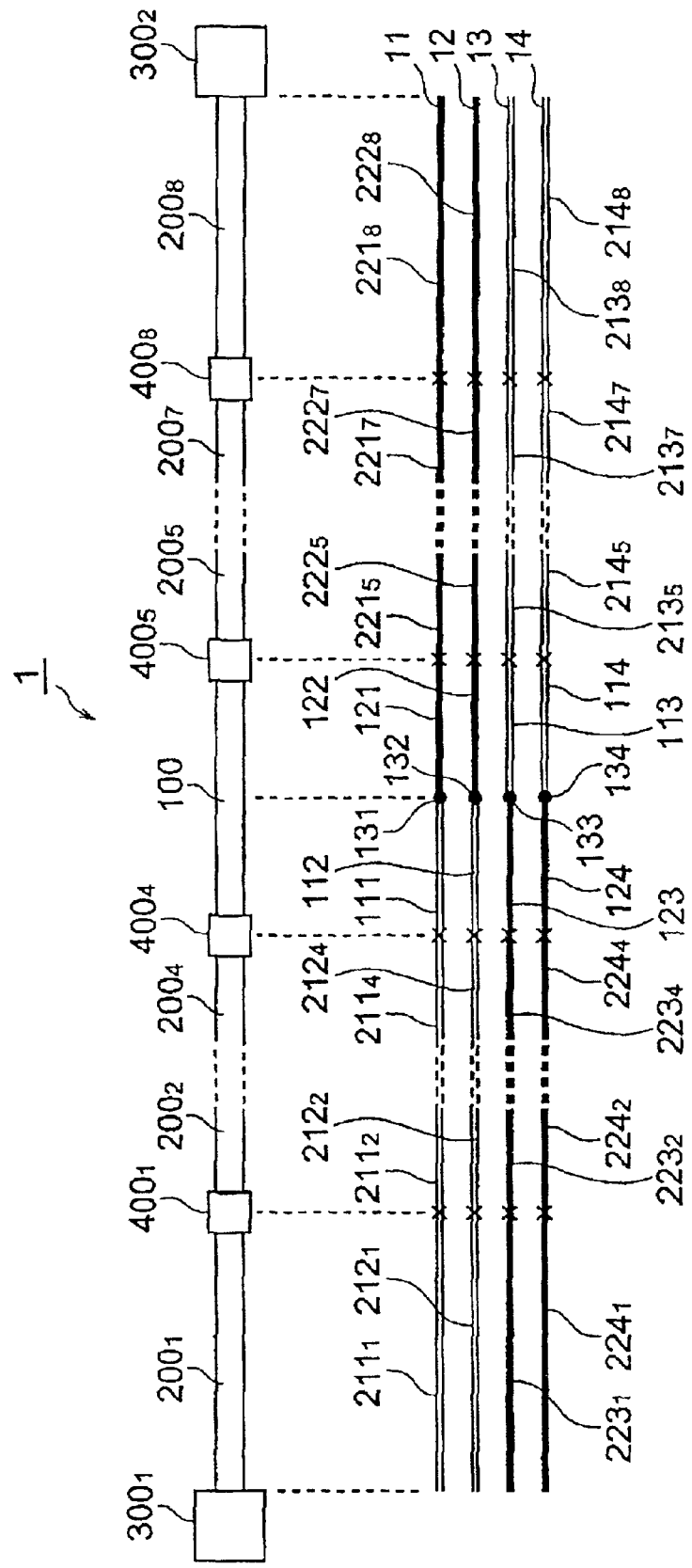
FIG. 2 is an illustration of installation method for the optical cables and optical transmission line relating to the first embodiment of the present invention.

A description will now be given of the first embodiment of a method of installing the optical cable, and an optical transmission line of the present invention. FIG. 2 is an illustration of the first embodiment. The optical transmission line, denoted by 1 in this figure, has optical cables $200_1$ to $200_4$ inclusive, an optical cable 100 of the same type as described before, and optical cables $200_5$ to $200_8$ inclusive. These optical cables are installed in this order between a repeater station $300_1$ and $300_2$. Each of the optical cables $200_n$ (n=1 to 4 inclusive) between the repeater station $300_1$ and the optical cable 100 accommodates first optical fibers $211_n$ and $212_n$ (n=1 to 4 inclusive) together with second optical fibers $223_n$ and $224_n$ (n=1 to 4 inclusive). Likewise, each of the optical cables $200_n$ (n=5 to 8 inclusive) between the repeater station $300_2$ and the optical cable 100 accommodates first optical fibers $213_n$ and $214_n$ (n=5 to 8 inclusive) together with second optical fibers $221_n$ and $222_n$ (n=5 to 8 inclusive).

Each of the first optical fibers $211_n$ and $212_n$ (n=1 to 4 inclusive), as well as each of the first optical fibers $213_n$ and $214_n$ (n=5 to 8 inclusive), is of the same type as that of the first optical fibers 111 to 114 inclusive accommodated in the optical cable 100 and, therefore, has a positive chromatic dispersion at the signal light wavelength. Each of these first optical fibers is preferably provided with information for identification similar to that given to the first optical fibers 111 to 114 inclusive. Each of the second optical fibers $223_n$ and $224_n$ (n=1 to 4 inclusive), as well as each of the second optical fiber $221_n$ and $222_n$ (n=5 to 8 inclusive), is of the same type as that of the second optical fibers 121 to 124 inclusive accommodated in the optical cable 100 and, therefore, has a negative chromatic dispersion at the signal light wavelength. Each of these second optical fibers is preferably provided with information for identification similar to that given to the second optical fibers 121 to 124 inclusive.

The optical transmission line has four optical fiber lines 11 to 14 inclusive. The optical fiber line 11 includes first optical fibers $211_n$ (n=1 to 4 inclusive), the first optical fiber 111, the second optical fiber 121, and second optical fibers $221_n$ (n=5 to 8 inclusive), which are connected by fusion splicing in series in this order. The optical fiber line 12 includes the first optical fibers $212_n$ (n=1 to 4 inclusive), the first optical fiber 112, the second optical fiber 122, and the second optical fibers $222_n$ (n=5 to 8 inclusive), which are connected by fusion splicing in series in this order.

The optical fiber line 13 includes the second optical fibers $223_n$ (n=1 to 4 inclusive), the second optical fiber 123, the first optical fiber 113, and first optical fibers $213_n$ (n=5 to 8 inclusive), which are connected by fusion splicing in series in this order. The optical fiber line 14 includes the second optical fibers $224_n$ (n=1 to 4 inclusive), the second optical fiber 124, the first optical fiber 114, and first optical fibers $214_n$ (n=5 to 8 inclusive), which are connected by fusion splicing in series in this order.

As described previously, the joints 131 to 134 inclusive have been formed by fusion splicing and then placed in the optical cable 100 in the factory. However, fusion splicing operation is conducted at the site or field for each of the following joints: namely, the joints between the optical fibers accommodated in the optical cable $200_n$ and those accommodated in the optical cable $200_n$+1 (n=1 to 3, 5 to 7 inclusive); the joints between the optical fibers accommodated in the optical cable $200_4$ and those accommodated in the optical cable 100; and the joints between the optical fibers accommodated in the optical cable 100 and those accommodated in the optical cable $200_5$.

The junctions between each optical cable $200_n$ and the adjacent optical cable $200_n$+1 are encased in joint closures $400_n$ (n=1 to 3 inclusive). The junction between the optical cable $200_4$ and optical cable 100 is encased in a joint closure $400_4$. The junction between the optical cable 100 and optical cable $200_5$ is encased in a joint closure $400_5$. The junctions between each optical cable $200_n$-1 and the adjacent optical cable $200_n$ are encased in joint closures $400_n$(n=6 to 8 inclusive).

In accordance with the above described method for installing optical cables, the operation of connecting different types of optical fibers by fusion splicing need not be conducted at the site or field. In other words, the splicing operation is conducted at the field only for the same type of optical fibers. Consequently, this facilitates the splicing operation at the field and enables reduction of slicing loss at each junction, and thereby reduces the overall loss in the optical transmission line 1. In addition, it is not necessary to conduct a special operation for reducing the splicing loss like heat treatment after fusion splicing. The necessity for using a large-scale splicing machine also is eliminated, and the time required for the splicing operation is shortened, thus contributing to improvement of efficiency in the construction work for installing the optical transmission line.

The optical transmission line 1 comprising the optical cables installed and connected by the above-described method is a hybrid optical transmission line. That is, concerning the optical fiber line 11, the first optical fiber $211_n$ (n=1 to 4 inclusive) and the first optical fiber 111, each having a positive chromatic dispersion at the signal light wavelength have been spliced together and placed on the side of repeater station $300_1$, and then, the second optical fiber 121 and second optical fiber $221_n$ (n=5 to 8 inclusive), each having a negative chromatic dispersion at the signal light wavelength, have been spliced together and placed on the side of the repeater station $300_2$. The optical fiber line 12 employs the same arrangement as the optical fiber line 11.

With regard to the optical fiber line 13, the second optical fiber $223_n$ (n=1 to 4 inclusive) and the second optical fiber 123, each having a negative chromatic dispersion at the signal light wavelength have been connected together by fusion splicing and placed on the side of the repeater station $300_1$, and consecutively, the first optical fiber 113 and first optical fiber $213_n$ (n=5 to 8 inclusive), each having a positive chromatic dispersion at the signal light wavelength, have been connected together by fusion splicing and placed on the side of the repeater station $300_2$. The optical fiber line 14 employs the same arrangement as the optical fiber line 13.

Therefore, the optical fiber line 11 or 12 can be advantageously used for transmission of signal light from the repeater station $300_1$ to $300_2$. Conversely, for transmission of optical signal light from the repeater station $300_2$ to $300_1$, the optical fiber line 13 or 14 is preferably used. Such a selective use of the optical fiber lines effectively suppresses degradation of the signal attributable to a non-linear optical effect, because the first optical fiber having a larger effective area is used at the upstream portion of the optical transmission line 1 where the signal light power is high. At the same time, the absolute value of the overall chromatic dispersion can be reduced, thereby suppressing degradation of the signal caused by such overall chromatic dispersion. Thus, such optical transmission line can suitably be used for an optical transmission system that transmits a large volume of information over a long distance.

Figure 3:
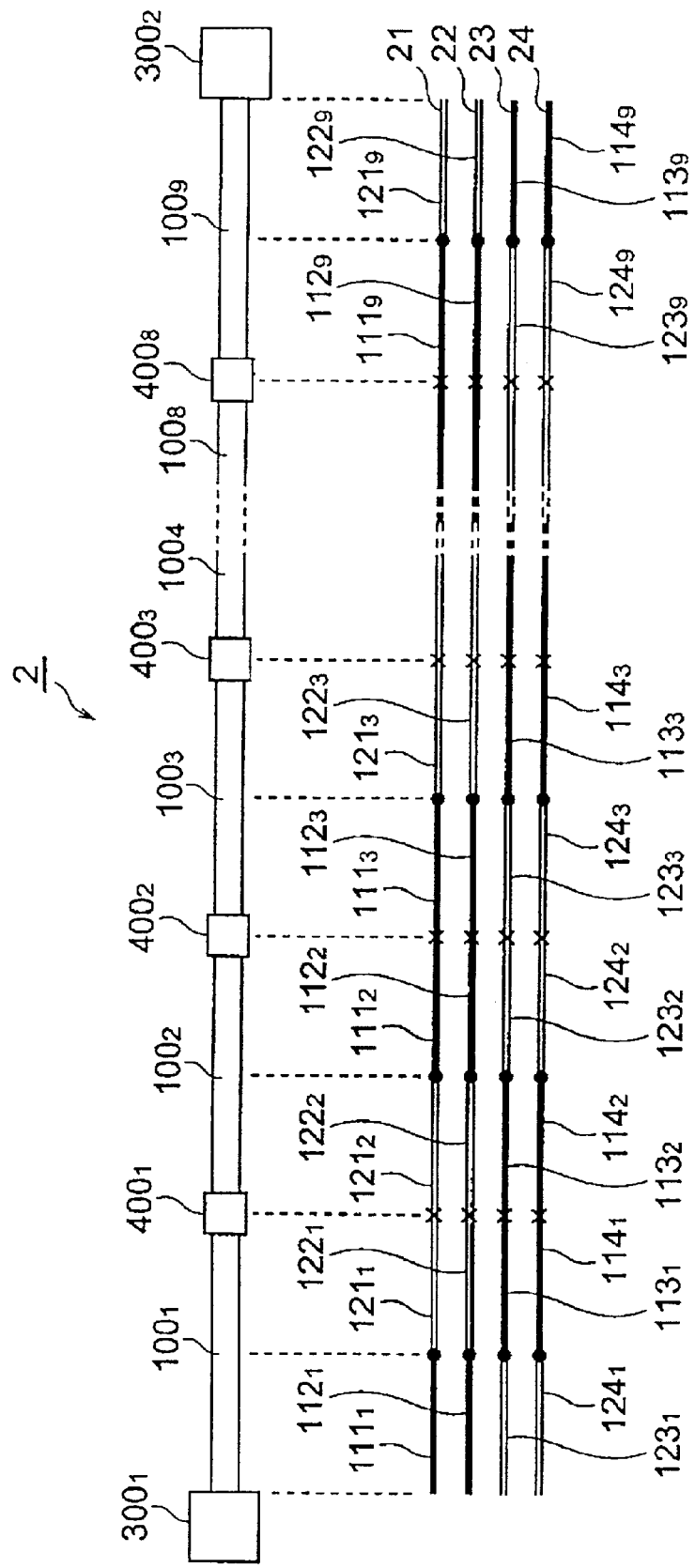
FIG. 3 is an illustration of installation method for the optical cables and optical transmission line relating to the second embodiment of the present invention.

A description will now be given of the second embodiment of the method for installing an optical cable and as well as the optical transmission line of the present invention, with specific reference to FIG. 3. The second embodiment of the optical transmission line denoted by 2, has optical cables from $100_1$ to $100_9$ inclusive installed and connected by fusion splicing in series between repeater stations $300_1$ and $300_2$. These optical cables $100_1$ to $100_9$ inclusive are relative to the present invention described previously. The optical transmission line 2 includes four optical fiber lines 21 to 24 inclusive.

The optical fiber line 21 is formed by connecting optical fibers by fusion splicing in the following sequence: a first optical fiber $111_1$ and a second optical fiber $121_1$ in the optical cable $100_1$; a second optical fiber $121_2$ and a first optical fiber $111_2$ in the optical cable $100_2$; a first optical fiber $111_3$ and a second optical fiber $121_3$ in the optical cable $100_3$; a second optical fiber $121_4$ and a first optical fiber $111_4$ in the optical cable $100_4$; a first optical fiber $111_5$ and a second optical fiber $121_5$ in the optical cable $100_5$; a second optical fiber $121_6$ and a first optical fiber $111_6$ in the optical cable $100_6$; a first optical fiber $111_7$ and a second optical fiber $121_7$ in the optical cable $100_7$; a second optical fiber $121_8$ and a first optical fiber $111_8$ in the optical cable $100_8$; and a first optical fiber $111_9$ and a second optical fiber $121_9$ in the optical cable $100_9$.

Similarly, the optical fiber line 22 is formed by connecting the first optical fibers $112_1$ to $112_9$ inclusive, and the second optical fibers $122_1$ to $122_9$, by fusion splicing, in the optical cables $100_1$ to $100_9$ inclusive in such a way that the first and second optical fibers appear alternately as in the case of the optical fiber line 21. Similarly, the optical fiber line 23 is formed by connecting the second optical fibers $123_1$ to $123_9$ inclusive, and the first optical fibers $113_1$ to $113_9$ inclusive by fusion splicing in the optical cables $100_1$ to $100_9$ inclusive, in such a way that the first and second optical fibers appear alternately as in the case of the optical fiber line 21. Likewise, the optical fiber line 24 is formed by connecting the second optical fibers $124_1$ to $124_9$ inclusive, and the first optical fibers $114_1$ to $114_9$ inclusive, by fusion splicing, in the optical cables $100_1$ to $100_9$ inclusive in such a way that the first and second optical fibers appear alternately as in the case of the optical fiber line 21.

As stated previously, the fusion splicing operation between each optical fibers of different types have been conducted and then accommodated in each respective optical cables $100_1$ to $100_9$ inclusive in the factory. The fusion splicing operation between each optical fibers in the optical cable $100_n$ and those in the optical cable $100_n+1$ is conducted at the field (n=1 to 8 inclusive). The junctions between each optical cable $100_n$ and $100_{n+1}$ are encased in joint closures $400_n$ (n=1 to 8 inclusive).

In accordance with the above described method for installing optical cables, the operation of connecting different types of optical fibers by fusion splicing is not required to be conducted at the site or field. In other words, the splicing operation to be conducted at the field involves only for optical fibers of the same type. Consequently, this facilitates the splicing operation at the field and enables a reduction of splicing loss at each junction and, thereby reduces the overall transmission loss along the optical transmission line 2. In addition, it is not necessary to conduct a special operation for reducing the splicing loss like heat treatment, after connecting adjacent optical fibers by fusion splicing. Further, a large-scale splicing machine is not required, and the time needed for the splicing operation can be shortened, thus contributing to efficiency and cost reduction of installing the optical transmission line.

The optical transmission line 2 comprising of optical cables installed and connected by the above-described method is a dispersion managed optical transmission line.

Namely, for each of the optical fiber lines 21 to 24 inclusive, sections having each positive and negative chromatic dispersion at the signal light wavelength are alternately arranged between the repeater stations $300_1$ and $300_2$, This optical transmission line 2, therefore, can effectively suppress degradation of the signal attributable to four-wave mixing, by setting the absolute values at respective points to large ones. By reducing absolute value of the overall chromatic dispersion over the entire optical transmission line, it is also possible to suppress degradation of the signal to be caused by overall chromatic dispersion. This dispersion managed optical transmission line can suitably be used in optical transmission systems for transmitting a large volume of information over a long distance.

Although the invention has been described through its preferred forms, it is to be understood that the described embodiments are solely illustrative, and various changes and modifications may be imparted thereto. For instance, while the optical cables have been described to have four fiber lines for the purpose of simplification of description, it is to be noted that other numbers of optical fiber lines may be employed in the optical cable of the present invention. The length of the first and second optical fiber may not be equal.

What is claimed is:

1. An optical cable to be installed on land, comprising:
   a first optical fiber having a positive chromatic dispersion at a signal light wavelength; and
   a second optical fiber having a negative chromatic dispersion at the same wavelength;
   wherein:
   said first and second optical fibers have been connected by fusion splicing at a joint being accommodated in said optical cable;
   the optical cable accommodates at least two optical fiber lines; and
   there is a first optical fiber and second optical fiber at both ends of the optical cable.

2. An optical cable according to claim 1, wherein said signal light wavelength is 1.55 μm.

3. An optical cable according to claim 2, having a length which is not less than 1 km but not more than 10 km.

4. An optical cable according to claim 2, wherein the ratio of the effective area of said first optical fiber to that of said second optical fiber is not more than 0.5 or not less than 2.0.

5. An optical cable according to claim 2, wherein the distance between said joint and an adjacent end of said optical cable is not less than 100 m.

6. An optical cable according to claim 2, wherein the absolute chromatic dispersion value of each of said first and second optical fibers is not less than 10 ps/nm/km at said signal light wavelength.

7. An optical cable according to claim 2, wherein said joint has been subjected to heat treatment and re-coated subsequent to said fusion-splicing.

8. An optical cable according to claim 2, wherein the splicing loss at said joint is not more than 0.3 dB.

9. An optical cable according to claim 2, wherein each of said first and second optical fibers is provided with information for identifying each type of optical fiber.

10. A method of installing an optical cable, comprising the steps of:
    preparing a first optical cable having a first optical fiber having a positive chromatic dispersion at a signal light wavelength and a second optical fiber having a negative chromatic dispersion at the same wavelength, said first and second optical fibers having been connected by fusion splicing to form a joint being accommodated in said first optical cable;

preparing a second optical cable accommodating a third optical fiber having a positive chromatic dispersion at said signal light wavelength and a fourth optical fiber having a negative chromatic dispersion at the same wavelength;

installing said first and second optical cables on land; and jointing said first and second optical cables in such a way that the first optical fiber and third optical fiber are connected together by fusion splicing or the second optical fiber and fourth optical fiber are connected together by fusion splicing.

11. A method of installing an optical cable, comprising the steps of:

preparing a first and second optical cables each having a first optical fiber having a positive chromatic dispersion at a signal light wavelength and a second optical fiber having a negative chromatic dispersion at the same wavelength, each respective pair of first and second optical fibers having been connected by fusion splicing to form a joint being accommodated in said respective optical cables;

installing said first and second optical cables on land; and jointing said first and second optical cables in such a way that the first optical fibers from each said optical cable are connected together by fusion splicing or the second optical fibers from each said optical cable are connected together by fusion splicing.

12. An optical transmission line, comprising:

a first optical cable having a first optical fiber having a positive chromatic dispersion at a signal light wavelength and a second optical fiber having a negative chromatic dispersion at the same wavelength, said first and second optical fibers having been connected by fusion splicing to form a joint being accommodated in said first optical cable;

a second optical cable accommodating a third optical fiber having a positive chromatic dispersion at said signal light wavelength and a fourth optical fiber having a negative chromatic dispersion at the same wavelength;

said first and second optical cables being installed on land and jointed together in such a way that the first optical fiber and third optical fiber are connected together by fusion splicing or the second optical fiber and fourth optical fiber are connected together by fusion splicing.

13. An optical transmission line, comprising:

a first and second optical cables, each having a first optical fiber having a positive chromatic dispersion at a signal light wavelength and a second optical fiber having a negative chromatic dispersion at the same wavelength, each respective pair of first and second optical fibers having been connected by fusion splicing to form a joint being accommodated in said respective first and second optical cables;

said first and second optical cables being installed on land and jointed together in such a way that the first optical fibers from each said optical cable are connected together by fusion splicing or the second optical fibers from each said optical cable are connected together by fusion splicing.

* * * * *